United States Patent [19]

Smith et al.

[11] Patent Number: 5,557,836
[45] Date of Patent: Sep. 24, 1996

[54] METHOD OF MANUFACTURING A CUBE CORNER ARTICLE

[75] Inventors: Kenneth L. Smith, White Bear Lake; Gerald M. Benson, Woodbury, both of Minn.

[73] Assignee: Minnesota Mining and Manufacturing Company, St. Paul, Minn.

[21] Appl. No.: 326,690

[22] Filed: Oct. 20, 1994

Related U.S. Application Data

[63] Continuation-in-part of Ser. No. 140,638, Oct. 20, 1993, abandoned.

[51] Int. Cl.$^6$ ............................................ B23P 17/00
[52] U.S. Cl. ........................... 29/527.4; 29/557; 359/530; 409/131
[58] Field of Search .......................... 29/558, 557, 527.3, 29/527.4; 359/529, 530, 546; 409/131, 132

[56] References Cited

U.S. PATENT DOCUMENTS

| | | |
|---|---|---|
| 1,591,572 | 7/1926 | Stimson . |
| 2,310,790 | 2/1943 | Jungersen ................................ 88/105 |
| 2,407,680 | 9/1946 | Palmquist et al. ......................... 88/82 |
| 3,190,178 | 6/1965 | McKenzie ................................. 88/82 |
| 3,417,959 | 12/1968 | Schultz .................................. 249/117 |
| 3,632,695 | 1/1972 | Howell ..................................... 264/1 |
| 3,684,348 | 8/1972 | Rowland ................................ 350/103 |
| 3,689,346 | 9/1972 | Rowland ................................ 156/245 |
| 3,712,706 | 1/1973 | Stamm .................................. 350/103 |
| 3,810,804 | 5/1974 | Rowland ................................ 156/245 |
| 3,811,983 | 5/1974 | Rowland ................................ 156/245 |
| 3,873,184 | 3/1975 | Heenan ............................... 359/530 X |
| 3,922,065 | 11/1975 | Schultz ................................. 350/103 |
| 3,924,929 | 12/1975 | Holmen et al. ....................... 350/103 |
| 3,926,402 | 12/1975 | Heenan ................................. 249/117 |
| 4,025,159 | 5/1977 | McGrath .............................. 350/105 |
| 4,066,331 | 1/1978 | Lindner .............................. 359/530 X |
| 4,202,600 | 5/1980 | Burke et al. ......................... 350/103 |
| 4,208,090 | 6/1980 | Heenan ................................. 350/61 |
| 4,243,618 | 1/1981 | Van Arnam ............................... 264/1 |
| 4,349,598 | 9/1982 | White .................................. 428/161 |
| 4,498,733 | 2/1985 | Flanagan .............................. 350/102 |
| 4,576,850 | 3/1986 | Martens ............................... 428/156 |
| 4,582,885 | 4/1986 | Barber ................................... 528/28 |
| 4,588,258 | 5/1986 | Hoopman .............................. 350/103 |
| 4,618,518 | 10/1986 | Pricone et al. ......................... 428/40 |
| 4,668,558 | 5/1987 | Barber ................................. 428/156 |
| 4,726,706 | 2/1988 | Attar ..................................... 404/14 |
| 4,801,193 | 1/1989 | Martin ................................. 350/103 |
| 4,895,428 | 1/1990 | Nelson et al. ........................ 350/103 |
| 4,938,563 | 7/1990 | Nelson et al. ........................ 350/103 |
| 5,122,902 | 6/1992 | Benson ................................. 359/529 |
| 5,171,624 | 12/1992 | Walter ................................. 428/156 |

FOREIGN PATENT DOCUMENTS

| | | |
|---|---|---|
| 0342958 | 11/1989 | European Pat. Off. ............... 359/530 |
| 272332 | 3/1914 | Germany ............................. 359/530 |
| 9217179 U | 4/1993 | Germany . |
| 4236799A1 | 5/1994 | Germany . |
| 61-290404 | 12/1986 | Japan .................................. 359/529 |
| 423464 | 2/1935 | United Kingdom . |
| 441319 | 1/1936 | United Kingdom . |
| 94/14091 | 12/1992 | WIPO . |

*Primary Examiner*—S. Thomas Hughes
*Attorney, Agent, or Firm*—Gary L. Griswold; Walter N. Kirn; Jed W. Caven

[57] ABSTRACT

A method of manufacturing a cube corner article comprises machining first and second intersecting groove sets in a machinable substrate wherein the grooves in the first set are displaced by a distance $d_1$ and the grooves in the second set are displaced by a distance $d_2$. A third groove set comprising a plurality of parallel grooves displaced by a distance $d_3$ is machined in the substrate, wherein $d_3$ is different from $d_1$ and $d_2$. The machining steps result in a structured surface comprising an array of cube corner elements including at least two non-congruently shaped cube corner elements.

10 Claims, 13 Drawing Sheets

METHOD OF MANUFACTURING A CUBE CORNER ARTICLE

CROSS-REFERENCE TO RELATED APPLICATION

This is a Continuation in Part of U.S. patent application Ser. No. 08/140,638, Multiple Structure Cube Corner Article and Method of Manufacture, filed Oct. 20, 1993, now abandoned.

FIELD OF INVENTION

This invention relates to retroreflective articles having prismatic retroreflective elements.

BACKGROUND

Many types of retroreflective elements are known, including prismatic designs incorporating one or more structures commonly known as cube corners. Retroreflective sheeting which employs cube corner type reflecting elements is well known. Cube corner reflecting elements are trihedral structures which have three approximately mutually perpendicular lateral faces meeting in a single corner. Light rays are typically reflected at the cube faces due to either total internal reflection or reflective coatings. The manufacture of directly machined arrays comprising retroreflective cube corner elements has many inefficiencies and limitations. Total light return and percent active aperture are adversely affected by these limitations, and overall production costs versus performance are often higher relative to the new class of articles and methods of manufacture taught below. The multiple structure arrays of this invention permit excellent manufacturing flexibility and production of cube corner element designs which are highly tailorable to particular needs.

SUMMARY OF INVENTION

The invention comprises a method of manufacturing a cube corner article comprising the steps of providing a machinable substrate material suitable for forming reflective surfaces, and creating a plurality of geometric structures including individual cube corner elements in the substrate. The step of creating the cube corner elements comprises directly machining at least three sets of parallel grooves in the substrate so that the intersections of the grooves within two groove sets are not coincident with at least one groove in a third groove set. The separation between the intersections of the grooves within two groove sets and at least one groove in a third groove set is greater than about 0.01 millimeters.

The invention also comprises a retroreflective cube corner article which is a replica of a directly machined substrate in which a plurality of geometric structures including cube corner elements are machined in the substrate. Each cube corner element is a single cube corner element which is bounded by at least one groove from each of three sets of parallel grooves in the substrate. The intersections of the grooves within two groove sets are not coincident with at least one groove in a third groove set.

The invention also comprises a retroreflective cube corner article which is a replica of a directly machined substrate in which a plurality of geometric structures including cube corner elements forming an array are machined in the substrate. Each cube corner element is bounded by at least one groove from each of three sets of parallel grooves. The article exhibits at least two different active aperture sizes at zero entrance angle.

The invention comprises a retroreflective cube corner article which is a replica of a directly machine substrate in which a plurality of geometric structures including cube corner elements formed in an array are machined in the substrate. Each cube corner element is a single cube corner element which is bounded by at least one groove from each of three sets of parallel grooves in the substrate. The array exhibits a plurality of different active aperture shapes.

The invention comprises a retroreflective cube corner article which is a replica of a directly machined substrate in which a plurality of geometric structures including cube corner elements are machined in the substrate. Each cube corner element is bounded by at least one groove from each of three sets of parallel grooves in the substrate so that the article comprises a plurality of different geometric structures.

The invention comprises a retroreflective cube corner article which is a replica of a directly machined substrate in which a plurality of geometric structures including cube corner elements are machined in the substrate. Each cube corner element is bounded by at least one groove from each of three sets of parallel grooves in the substrate so that, in plan view, at least one of the structures has more than three sides and less than six sides.

The invention comprises a method of manufacturing an article having a plurality of cube corner elements formed by directly machining three sets of grooves into a machineable substrate in any order. The method comprises the steps of directly machining a first groove set of parallel grooves along a first path in the substrate; directly machining a second groove set of parallel grooves along a second path in the substrate to create a plurality of rhombus shaped partial cube sub-elements; and directly machining a third groove set comprising at least one additional groove along a third path in the substrate, so that a plurality of different optically retroreflective geometric structures is formed in the article.

The invention comprises a retroreflective cube corner article which is a replica of a directly machined substrate in which at least two geometrically different matched pairs of cube corner elements are machined in the substrate by grooves from each of three sets of parallel grooves in the substrate.

The invention comprises a retroreflective cube corner article which is a replica of a directly machined substrate in which a plurality of geometric structures including cube corner elements are machined in the substrate. The shape of the active aperture of at least one cube corner element is determined at least in part by an edge of the cube corner not coincident with the base.

The invention comprises a retroreflective cube corner article which is a replica of a directly machined substrate in which a plurality of grooves in groove sets are machined in the substrate to form structures including cube corner elements. The article exhibits asymmetric entrance angularity when rotated about an axis within the plane of the substrate.

The invention comprises a retroreflective cube corner element composite sheeting comprising a plurality of zones of retroreflective cube corner elements. Each zone comprises a replica of a directly machined substrate in which a plurality of cube corner elements are machined. The composite sheeting comprises at least one zone comprising geometric structures including retroreflective cube corner elements which exhibits asymmetric entrance angularity when rotated about an axis within the plane of the substrate.

The invention comprises a retroreflective cube corner element composite sheeting comprising a plurality of zones of retroreflective cube corner elements. Each zone comprises a replica of a directly machined substrate in which a plurality of geometric structures including individual cube corner elements are machined. Each individual cube corner element is bounded by at least one groove from each of three sets of parallel grooves in the substrate. The grooves are arranged so that a plurality of different optically retroreflective geometric structures is formed in at least one zone of the sheeting.

The invention comprises a retroreflective cube corner element composite sheeting comprising a plurality of zones of retroreflective cube corner elements. Each zone comprises a replica of a directly machined substrate in which a plurality of geometric structures including individual cube corner elements are machined. Each individual cube corner element is bounded by at least one groove from each of three sets of parallel grooves. The intersections of the grooves within two groove sets are not coincident with at least one groove in a third set in at least one zone of the sheeting.

The invention comprises a retroreflective cube corner element composite sheeting composite sheeting comprising a plurality of zones of retroreflective cube corner elements. Each zone comprises a replica of a directly machined substrate in which a plurality of geometric structures including cube corner elements are machined. Each cube corner element is an individual cube corner element. At least one matched pair of cube corner elements with no coincident base edges is machined in the substrate in at least one zone of the sheeting.

DETAILED DESCRIPTION OF THE ILLUSTRATIVE EMBODIMENTS

The manufacture of retroreflective cube corner element arrays is accomplished using molds made by different techniques, including those known as pin bundling and direct machining. Molds manufactured using pin bundling are made by assembling together individual pins which each have an end portion shaped with features of a cube-corner retroreflective element. U.S. Pat. No. 3,926,402 (Heenan et al) and U.S. Pat. No. 3,632,695 (Howell) are examples of pin bundling.

The direct machining technique, also known generally as ruling, comprises cutting portions of a substrate to create a pattern of grooves which intersect to form cube corner elements. The grooved substrate is referred to as a master from which a series of impressions, i.e. replicas, may be formed. In some instances, the master is useful as a retroreflective article, however replicas, including multi-generational replicas, are more commonly used as the retroreflective article. Direct machining is an excellent method for manufacturing master molds for small micro-cube arrays. Small micro-cube arrays are particularly beneficial for producing thin replica arrays with improved flexibility, such as continuous rolled goods for sheeting purposes. Micro-cube arrays are also more conducive to continuous process manufacturing. The process of manufacturing large arrays is also relatively easier using direct machining methods rather than other techniques. One example of direct machining is shown in U.S. Pat. No. 4,588,258 (Hoopman).

Figure 1:
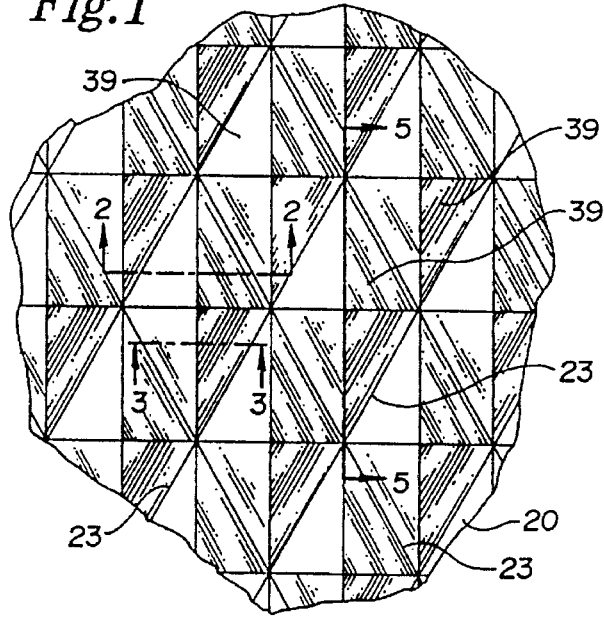
FIG. 1 is a plan view of a directly machinable substrate having two groove sets machined into the substrate to form partial cube shapes.
Figure 2:
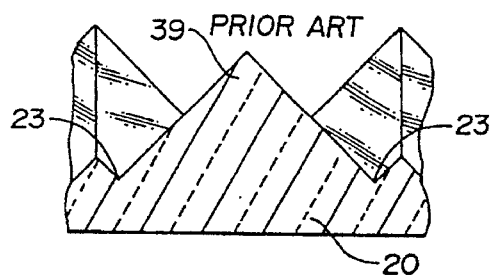
FIG. 2 is a section view of the substrate taken along line 2—2 in FIG. 1.
Figure 3:
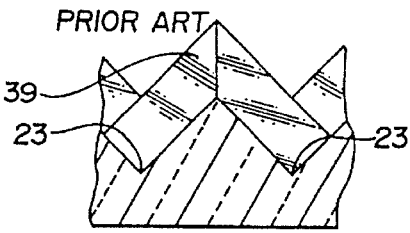
FIG. 3 is a section view of the substrate taken along line 3—3 in FIG. 1.
Figure 4:
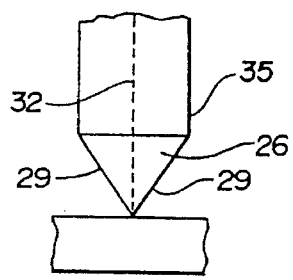
FIG. 4 is an elevation view of a machine tool used to form the grooves shown in FIG. 1.

FIG. 1 illustrates a method by which directly machined masters of conventional cube arrays are manufactured. A directly machinable substrate 20 receives a plurality of parallel grooves 23, arranged in two non-parallel sets. Grooves through directly machinable substrate 20 are formed by a machine tool with two opposing cutting surfaces for cutting cube corner optical faces. Examples of shaping, ruling, and milling techniques suitable for forming directly machined grooves are discussed in U.S. Pat. No. 3,712,706 (Stamm). The two sets of groove 23 produce the partial cube shapes 39 depicted in the sectional views of FIG. 2 and FIG. 3. Machine tool 26, such as that shown in FIG. 4, is typically mounted on a post 35 and has an optical face cutting surface 29 on each side of a tool central axis 32.

Figure 5:
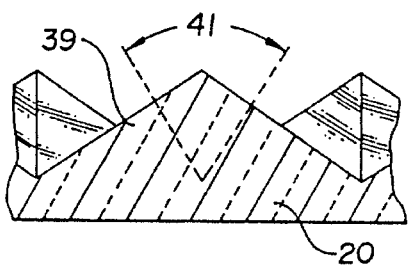
FIG. 5 is a section view of the substrate taken along line 5—5 in FIG. 1.
Figure 6:
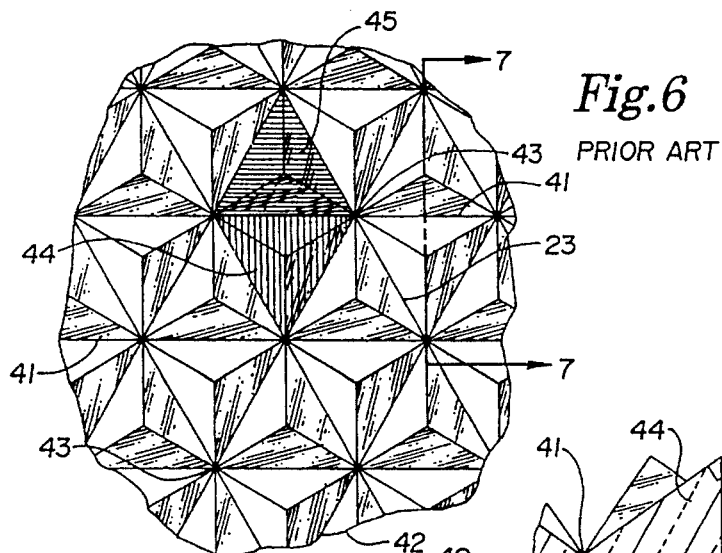
FIG. 6 is a plan view of a portion of a directly machined three groove set array having matched pairs of retroreflective elements.
Figure 7:
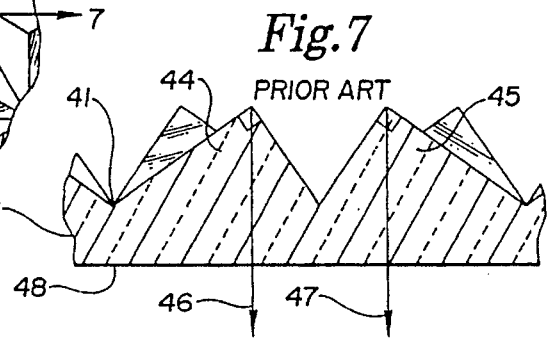
FIG. 7 is a section view of the array taken along line 7—7 in FIG. 6 showing individual non-canted cube corner element symmetry axes perpendicular to a base plane.

In FIGS. 1–4, partial cube shapes 39 are shown as rhombus shaped structures formed in substrate 20. At least two grooves 23 in both non-parallel groove sets are required to produce shapes 39. At least one third groove 41, as shown in sectional view dashed lines in FIG. 5, is required to produce conventional cube corner elements. Portions of a conventional cube array 42 after completion of the three groove sets are shown in FIGS. 6 and 7. Both sides of all grooves 23, 41 form cube corner element optical surfaces in array 42. An equilateral triangle is formed at the base of each cube corner reflecting element 44, 45. All of the cube corner element shapes have three sides when viewed in plan view. The grooves 23 and 41 mutually intersect at representative locations 43. Another example of this grooving is shown in U.S. Pat. No. 3,712,706 (Stamm). U.S. Pat. Nos. 4,202,600 (Burke et al) and 4,243,618 (Van Arnam) also disclose, and incorporate by reference, the triangular based corner reflecting elements or prisms shown in Stamm. The Burke et al patent discloses tiling of these prisms in multiple differently oriented zones to produce an appearance of uniform brightness to the eye when viewed at a high angle of incidence from at least a minimum expected viewing distance.

Conventional retroreflective cube corner element arrays are derived from a single type of matched pairs, i.e. geometrically congruent cube corner retroreflecting elements rotated 180°. These elements are also typically the same height above a common reference plane and share a coincident base edge. One example of this single matched pair derivation is shown in FIG. 6 with matched shaded pair of cube corner retroreflecting elements 44, 45 having a coincident base edge along groove 41. Other examples of this fundamental matched pair concept relating to conventional cube arrays is shown in U.S. Pat. No. 3,712,706 (Stamm), U.S. Pat. No. 4,588,258 (Hoopman), U.S. Pat. No. 1,591,572 (Stimson) and U.S. Pat. No. 2,310,790 (Jungersen). U.S. Pat. No. 5,122,902 (Benson) discloses another example of matched pairs of cube corner retroreflecting elements having coincident base edges, although these may be positioned adjacent and opposite to each other along a separation surface.

Another type of matched pair of cube corner elements is disclosed in German patent reference DE 42 42 264 (Gubela) in which a structure is formed having a micro-double triad and two single traids within a rhombic body. The structure is formed in a work piece using turning angles of 60 degrees and grinding directions which do not cross each other at one point, resulting in only two of the directions having a common point of intersection.

Figure 8:
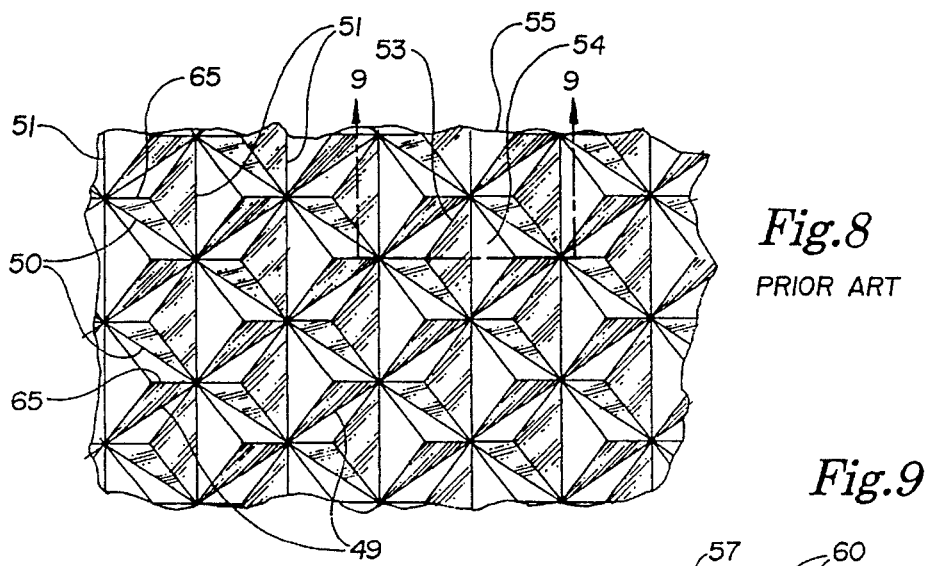
FIG. 8 is a plan view of a portion of a directly machined three groove set array having a plurality of canted cube corner elements.
Figure 9:
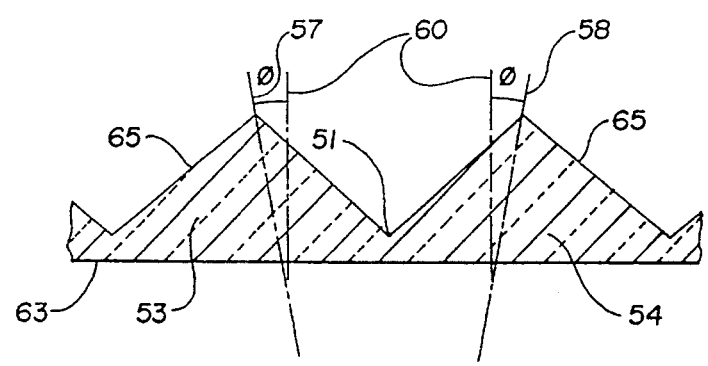
FIG. 9 is a section view of the array taken along line 9—9 in FIG. 8, including the symmetry axes of the cubes.

The above examples of cube corner element retroreflective arrays comprise non-canted cubes which have individual symmetry axes 46, 47 that are perpendicular to a base plane 48, as shown in FIG. 7. The symmetry axis is a central or optical axis which is a trisector of the internal or dihedral angles defined by the faces of the element. However, in some practical applications it is advantageous to cant or tilt the symmetry axes of the matched pair of cube corner retroreflective elements to an orientation which is not perpendicular to the base plane. The resulting canted cube-corner elements combine to produce an array which retroreflects over a wide range of entrance angles. This is taught in U.S. Pat. No. 4,588,258 (Hoopman), and is shown in FIGS. 8 and 9. The Hoopman structure is manufactured with three sets of parallel V-shaped grooves 49, 50, 51 that mutually intersect to form a single type of geometrically congruent matched pairs of canted cube corner elements 53, 54 in array 55. All of the cube corner element shapes have three sides when viewed in plan view. Both sides of all grooves 49, 50, 51 form cube corner element optical surfaces in array 55.

FIG. 9 illustrates the symmetry axis 57 for cube corner element 53, and the symmetry axis 58 for cube corner element 54. The symmetry axes are each tilted at angle ø with respect to a line 60 that lies normal to a base plane 63, or the front surface, of the element. The base plane is usually co-planar or parallel with the front surface of a sheeting comprising the cube corner element array. Cube corner elements 53, 54 are geometrically congruent, exhibit symmetric optical retroreflective performance with respect to entrance angle when rotated about an axis within the plane of the substrate, and have symmetry axes which are not parallel to each other. Entrance angle is commonly defined as the angle formed between the light ray entering the front surface and line 60.

Canting may be in either a forward or backward direction. The loopman patent includes disclosure of a structure having an amount of cant up to 13° for a refractive index of 1.5. Hoopman also discloses a cube with a cant of 9.736°. This geometry represents the maximum forward cant of cubes in a conventional array before the grooving tool damages cube optical surfaces. The damage normally occurs during formation of a third groove when the tool removes edge portions of adjacent elements. For example, as shown in FIG. 8, for forward cants beyond 9.736°, the cube edge 65 is formed by the first two grooves 49, 50 and is removed by forming the primary groove 51. U.S. Pat. No. 2,310,790 (Jungersen) discloses a structure which is canted in a direction opposite that shown in the Hoopman patent.

Figure 10:
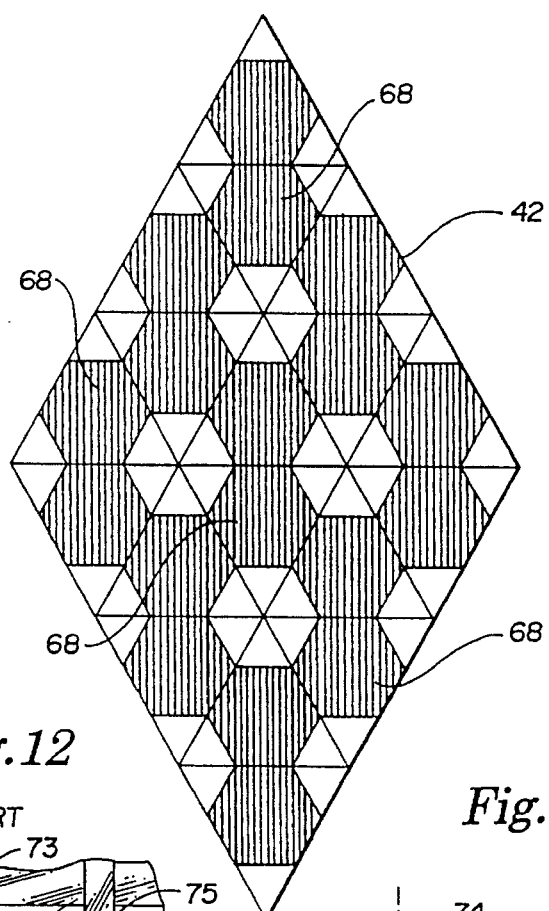
FIG. 10 is a plan view of the zero entrance angle active apertures of the array shown in FIGS. 6 and 7.

For these conventional arrays, optical performance is conveniently defined by the percent of the surface area that is actually retroreflective, i.e. which comprises an effective area or active aperture. The percent active aperture varies as a function of the amount of canting, refractive index, and the entrance angle. For example, shaded areas 68 of FIG. 10 represent the active apertures of the individual cube corner retroreflective elements in array 42. The hexagonal percent active aperture of this equilateral 60°—60°—60° base angle geometry array at a zero entrance angle is about 67 percent, which is the maximum possible for a conventional three groove array. All the hexagonal active apertures have the same size and shape in this example.

At non-zero entrance angles, conventional arrays display, at most, two different aperture shapes of roughly similar size. These result from the single type of geometrically congruent matched pairs of conventional cube corner elements. Canted conventional cube corner arrays exhibit similar trends, although the shape of the aperture is affected by the degree of canting.

As discussed in U.S. Pat. No. 5,171,624 (Walter), diffraction from the active apertures in nearly orthogonal conventional cube corner arrays tends to produce undesirable variations in the energy pattern or divergence profile of the retroreflected light. This results from all the active apertures being roughly the same size in conventional arrays and therefore exhibiting roughly the same degree of diffraction during retroreflection.

The active apertures of conventional arrays are determined by the base edges of the cubes. For example, the six sides of the hexagonal apertures 68 of FIG. 10 are determined by the three base edges and the image of these edges reflected through the cube peak. The three base edges and their image generally determine the aperture shape for conventional canted and uncanted arrays at any entrance angle.

Figure 12:
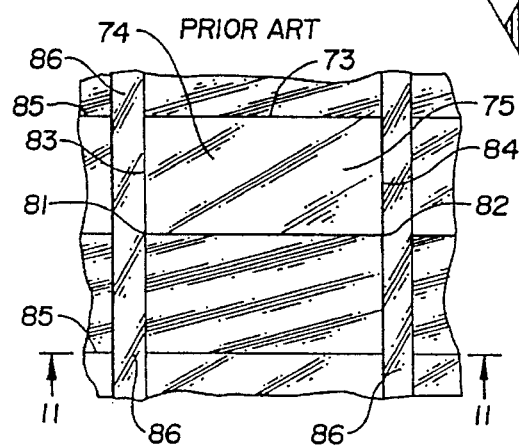
FIG. 12 is a plan view of a portion of the array of FIG. 11.
Figure 11:
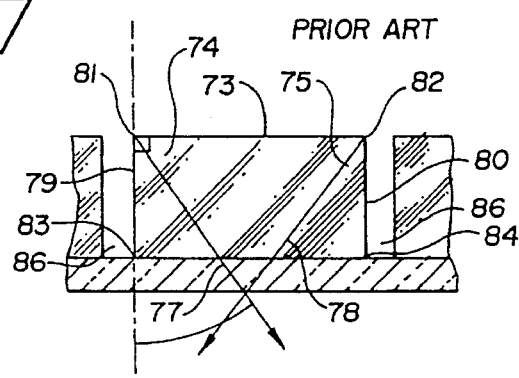
FIG. 11 is a section view of a portion of an array having individual cube corner elements configured in an extreme backward cant.

Some conventional cube corner arrays are manufactured with additional optical limitations, perhaps resulting from canting or other design features, to provide very specific performance under certain circumstances. One example of this is the structure disclosed in U.S. Pat. No. 4,349,598 (White). FIGS. 11 and 12 schematically depict, in side and plan views respectively, White's extreme backward cant associated with one geometric limit of a conventional cube design. In this design, cube structure 73 is derived from a matched pair of cube corner elements 74, 75 with symmetry axes 77, 78. Cube corner elements 74, 75 are each canted in a backward direction to the point that each of the base triangles is eliminated, resulting in two vertical optical faces 79, 80. This occurs when the cube peaks 81, 82 are directly above the base edges 83, 84 and the base triangles have merged to form a rectangle. Only two groove sets are required, using tools with opposing cutting surfaces, to create this cube structure in a substrate. One groove set has a 90° V-shaped cut 85 and the other groove set has a rectangular cut shaped as a channel 86. Both sides of all grooves 85, 86 form cube corner element optical surfaces in array 73. In the White design, the pair of cube corner reflecting elements are specifically arranged to provide a high active aperture at large entrance angles. The aperture shapes for the White design are bounded by the base. Also, the structure disclosed by White has four sides in plan view.

Figure 14:
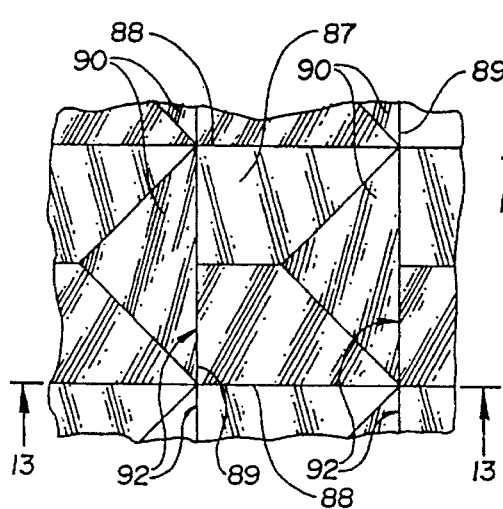
FIG. 14 is a plan view of a portion of the array of FIG. 13.
Figure 13:
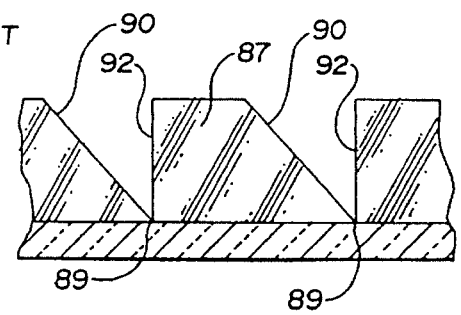
FIG. 13 is a section view a portion of an array similar to that shown in FIGS. 11 and 12 modified by reducing the length of each cube corner element and by eliminating one cube vertical optical face.

A further modification to the conventional cube corner arrays and to the White design is disclosed in U.S. Pat. No. 4,895,428 (Nelson et al). The cube structure 87 disclosed by Nelson et al, shown in the side view of FIG. 13 and the plan view of FIG. 14, is derived by reducing the length of the White element 73 and by eliminating one of the cube vertical optical faces 79, 80. Like the White design, manufacture of the Nelson et al structure also requires only two groove sets 88, 89. Both sides of all the grooves 88 form cube corner element optical surfaces in array 87. Nelson must also have at least one vertical retroreflective face. This is accomplished by replacing the tool for cutting the White rectangular channel with an offset tool. The Nelson et al tool forms a non-retroreflective surface 90, using a tool relief surface, and a vertical retroreflective surface 92 using the tool vertical sidewall. The aperture shapes for the Nelson design are bounded by the base. Also, the structure disclosed by Nelson has four sides in plan view. U.S. Pat. No. 4,938,563 (Nelson et al) further modifies the White design by the addition of, inter alia, canted bisector elements.

Conventional cube corner retroreflective element designs include structural and optical limitations which are overcome by use of the multiple structure cube corner retroreflective element structures and methods of manufacture described below. Use of this new class of multiple structure retroreflective cube corner element structures and manufacturing methods permits diverse cube corner element shaping. For example, cubes in a single array may be readily manufactured with raised discontinuous geometric structures having different heights or different shapes. Use of multiple structure methods and structures also permits manufacture of cube arrays which have highly tailorable optical performance. For example, at many entrance angles, including at zero entrance angle, multiple structure arrays outperform conventional arrays by exhibiting higher percent active apertures or by providing improved divergence profiles, or both. Multiple structure manufacturing techniques may also produce enhanced optical performance resulting from closely spaced intermixed cubes with different active aperture shapes and sizes. This presents more uniform appearances of multiple structure arrays over a wide range of viewing distances under both day and night observation conditions. Multiple structure arrays may also be based on more than one type of matched pair of cube corner elements. Matched pairs may have base edges which are non-coincident or which have only a single point of intersection which is common. These advantages of multiple structure cube corner elements enhance the usefulness of articles having these elements. Such articles include, for example, traffic control materials, retroreflective vehicle markings, photoelectric sensors, directional reflectors, and reflective garments for human or animal use.

Multiple structure cube corner element arrays may be of unitary or composite, i.e. tiled, construction, and may be formed using tools with either one or both sides configured for cutting retroreflective optical surfaces. Manufacture of multiple structure cube corner element master arrays, as well as multi-generational replicas, results in diverse and highly adaptable optical performance and cost efficiencies. These and other advantages are described more fully below.

A substrate suitable for forming retroreflective surfaces according to this invention may comprise any material suitable for forming directly machined grooves or groove sets. Suitable materials should machine cleanly without burr formation, exhibit low ductility and low graininess, and maintain dimensional accuracy after groove formation. A variety of materials such as machinable plastics or metals may be utilized. Suitable plastics comprise thermoplastic or thermoset materials such as acrylics or other materials. Suitable metals include aluminum, brass, nickel, and copper. Preferred metals include non-ferrous metals. Preferred machining materials should also minimize wear of the cutting tool during formation of the grooves.

Figure 15:
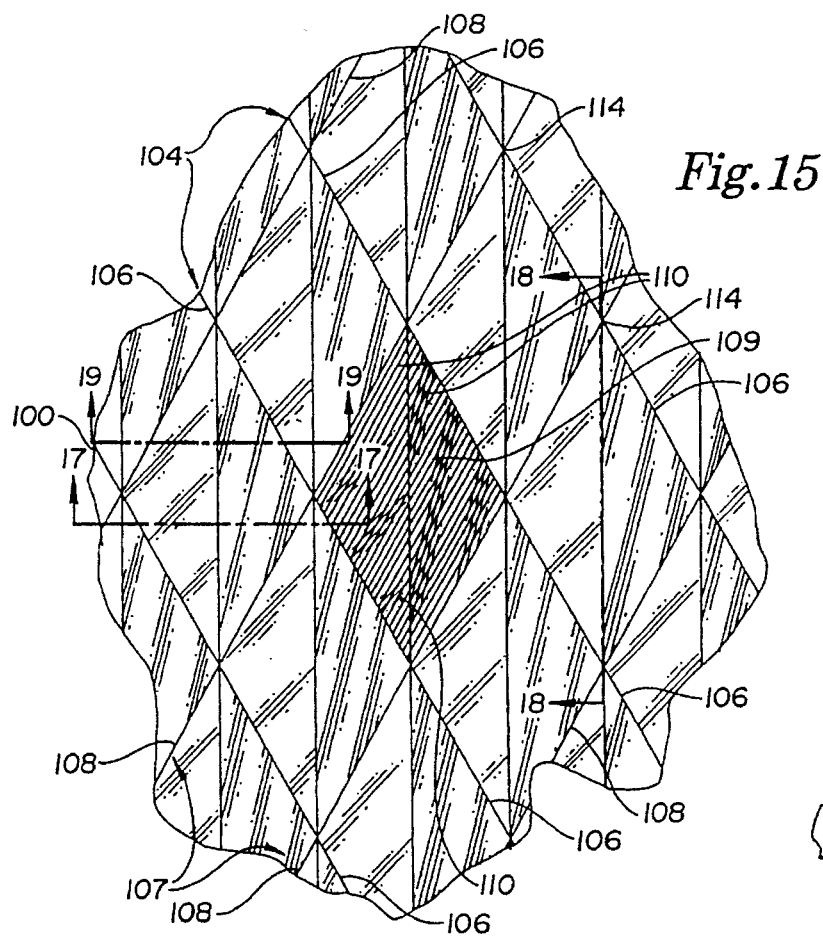
FIG. 15 is a plan view of a portion of a directly machined substrate.

FIG. 15 discloses one method by which directly machined masters of multiple geometric structure cube corner element arrays are manufactured. A directly machined substrate 100 receives a plurality of parallel grooves arranged in two non-parallel sets, which may have variable spacing between grooves. Grooves may be formed using either single or multiple passes of a machine tool through substrate 100. Each groove is preferably formed by a machine tool which has only one side configured for cutting a retroreflective non-vertical optical surface and which is maintained in an approximately constant orientation relative to the substrate during the formation of each groove. Each groove forms the side surfaces of geometric structures which may include individual cube corner optical or non-optical elements.

Figure 18:
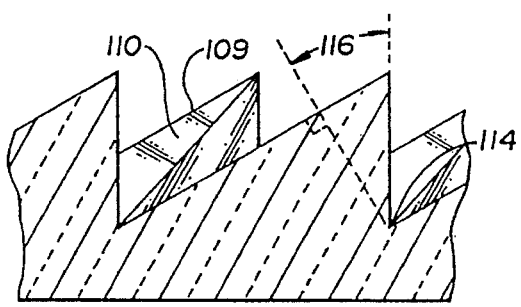
FIG. 18 is a section view of the substrate taken along line 18—18 in FIG. 15.

A more detailed description of a method of manufacturing a multiple structure cube corner element array is to directly machine a first groove set 104 of parallel grooves 106 cut into substrate 100 along a first path. A second groove set 107 of parallel grooves 108 is then directly machined along a second path in substrate 100. The machining of the first and second groove sets, also referred to as the two secondary grooves or secondary groove sets, creates a plurality of rhombus or diamond shaped partial cube sub-elements 109, depicted in shaded highlight in one instance for ease of recognition. Each partial cube sub-element comprises two orthogonal optical faces 110, as shown in FIGS. 15, 17, 18 and 19. Preferably, only one side of grooves 106 and 108 form the orthogonal faces 110 on partial cube sub-element 109. The secondary grooves intersect at locations 114. Multiple structure arrays may be compared to conventional arrays at this point of manufacture by comparing analogous views of FIGS. 1 and 15, 2 and 19, 3 and 17, and 5 and 18. After formation of the secondary grooves, a third or primary groove set, which may contain as few as one groove, is cut along a third path in substrate 100. In FIG. 18, a representative primary groove 116, which in this example mutually intersects the secondary grooves 106 and 108, is shown in dotted lines. A more detailed discussion of such primary groove(s) is found below in relation to groove set 128 and groove(s) 130 depicted in the array embodiment of FIG. 20.

Figure 16:
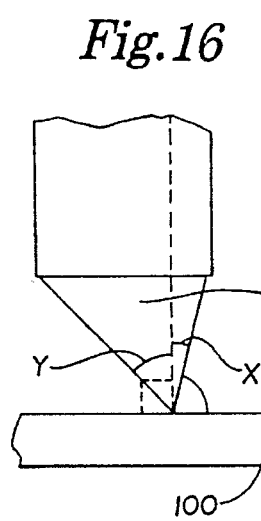
FIG. 16 is an elevation view of a half angle tool used to machine the substrate shown in FIG. 15.
Figure 17:
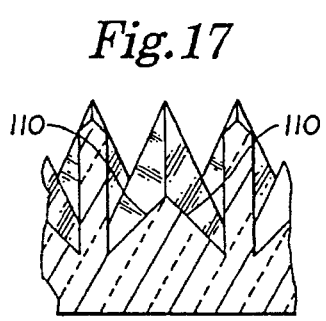
FIG. 17 is a section view of the substrate taken along line 17—17 in FIG. 15.
Figure 19:
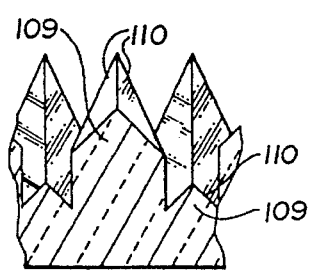
FIG. 19 is a section view of the substrate taken along line 19—19 in FIG. 15.
Figure 20:
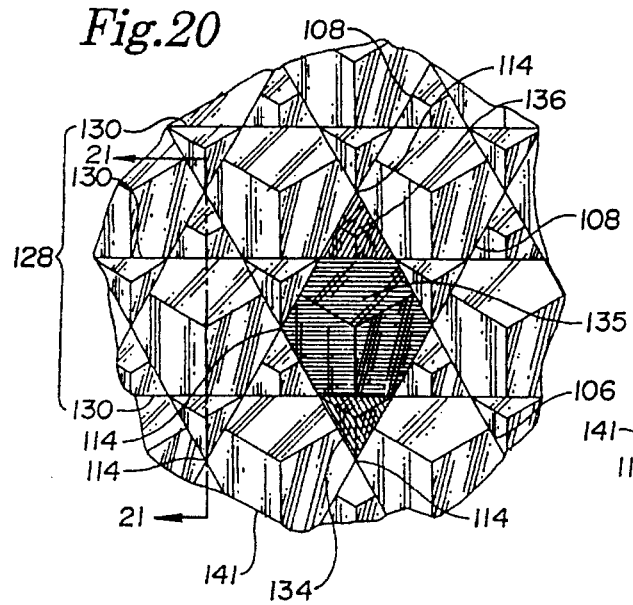
FIG. 20 is a plan view of a directly machined array having three non-parallel non-mutually intersecting sets of grooves.
Figure 21:
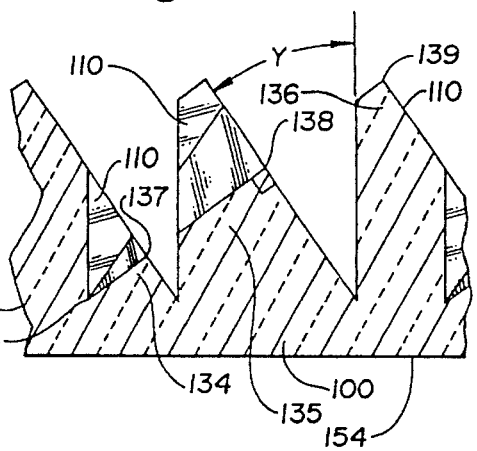
FIG. 21 is a section view of the array taken along line 21—21 in FIG. 20.

Each of the secondary grooves 106, 108 are preferably formed using a novel half angle tool 118, shown in one embodiment in FIG. 16. The relief angle X may be any angle, although a preferred range of angles is between 0° and 30°. In FIGS. 15, and 17–23 relief angle X is 0°. The tool side angle Y shown in FIG. 16 is non-zero and preferably specified to create orthogonal or nearly orthogonal cube optical surfaces. After formation of the secondary grooves, a third or primary groove set 128, which may contain as few as one groove 130, is preferably cut using a pass along a third path in substrate 100. The addition of a plurality of parallel primary grooves 130 is shown in FIGS. 20 and 21. Third groove set 128 is cut through partial cube sub-elements so that non-canted individual cube corner elements 134, 135, 136, with cube peaks 137, 138, 139 are formed by the intersections of the primary groove(s) with the orthogonal faces of the partial cube sub-elements. Cube corner elements 134, 135, 136 comprise multiple geometric structures which, in plan view, have either three or six sides in array 141.

The invention also comprises a method of manufacturing a retroreflective cube corner article which is a replica of a directly machined substrate in which a plurality of geometric structures including cube corner elements are formed in the substrate. In this embodiment of the invention, each cube corner element is bounded by at least one groove from each of three sets of parallel grooves in the substrate. It is recognized that grooves or groove sets in a method of forming cube corner elements according to this invention may comprise a different scope and meaning from grooves or groove sets which bound or form a cube corner element in known articles. For example, in known articles, multiple passes of a machine tool may be required to form a single groove.

Other embodiments of this method include creation of an article, or replicas of the article, which further modify the shape of the retroreflected light pattern. These embodiments comprise at least one groove side angle in at least one set of grooves which differs from the angle necessary to produce an orthogonal intersection with other faces of elements defined by the groove sides. Similarly, at least one set of grooves may comprise a repeating pattern of at least two groove side angles that differ from one another. Shapes of grooving tools, or other techniques, may create cube corner elements in which at least a significant portion of at least one cube corner element optical face on at least some of the cubes are arcuate. The arcuate face may be concave or convex. The arcuate face, which was initially formed by one of the grooves in one of the groove sets, is flat in a direction substantially parallel to said groove. The arcuate face may be cylindrical, with the axis of the cylinder parallel to said groove, or may have a varying radius of curvature in a direction perpendicular to said groove.

FIG. 20 further discloses a multiple structure cube array 141 in which primary grooves 130 do not pass through the secondary grooves 106, 108 at the mutual intersection locations 114 of the secondary grooves. Primary grooves 130 are equally spaced and centered on secondary groove intersection locations 114. Array 141 presents yet another novel feature of multiple structure cube corner technology. In particular, a method is disclosed for manufacturing a cube corner article by directly machining three non-parallel non-mutually intersecting sets of grooves. Preferably, these sets intersect at included angles less than 90°. It is recognized that certain machining imprecisions may create minor, unintentional separation between grooves at intersections. However, this invention involves intentional and substantial separation. For example, a separation distance between the intersections of the grooves within two groove sets with at least one groove in a third groove set which is greater than about 0.01 millimeters would likely provide the advantages of this feature. However, the precise minimum separation distance is dependent on the specific tooling, substrate, process controls, and the desired optical performance sought.

Non-mutually intersecting groove sets create multiple geometric structures including cube corner elements with different active aperture sizes and shapes. Arrays may even be formed with cube corners created by a combination of mutually and non-mutually intersecting groove sets. The position of the groove sets is controlled to produce maximum total light return over a desired range of entrance angles. Also the distance between grooves in at least one groove set might not be equal to the distance between grooves in at least another of the groove sets. It is also possible to machine at least one set of parallel grooves into a substrate in a repeating fashion with the set comprising a distance between grooves which is optionally variable at each machining of the set. Also, a portion of any one of the grooves may be machined to a depth that is different from at least one other groove depth.

FIG. 21 illustrates the multiple cube surfaces which are formed during direct machining of a groove in substrate 100. FIG. 21 shows that the plurality of optical surfaces and cube peaks 137, 138, 139 are created at different heights above a common reference plane 154.

Figure 22:
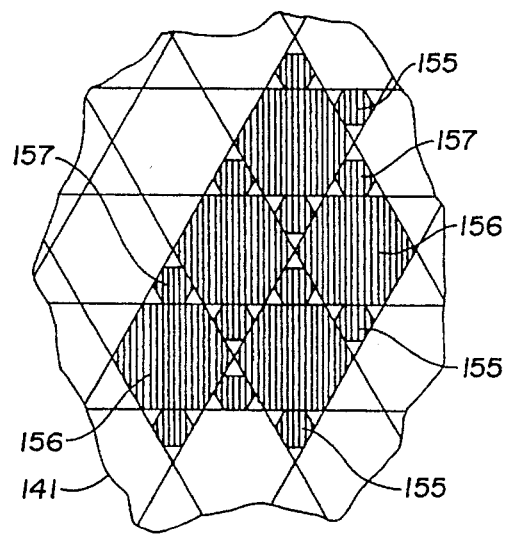
FIG. 22 is a plan view of the active apertures of a portion of a multiple structure retroreflective cube corner element array depicted in FIG. 20.

FIG. 22 is a plan view of a portion of multiple structure retroreflective cube corner element array 141 with shaded areas 155, 156, 157 representing three different active apertures, intermixed and arranged in close proximity and corresponding to cube types 134, 135, and 136. A conventional non-canted cube corner element array with an equilateral base triangle, at 0° entrance angle, provides a maximum of only about 67 percent active aperture. However, a multiple structure cube corner element array similar to that shown in FIG. 23 may have a percent active aperture greater than about 70 percent and possibly as high as about 92 percent at 0° entrance angle.

Figure 23:
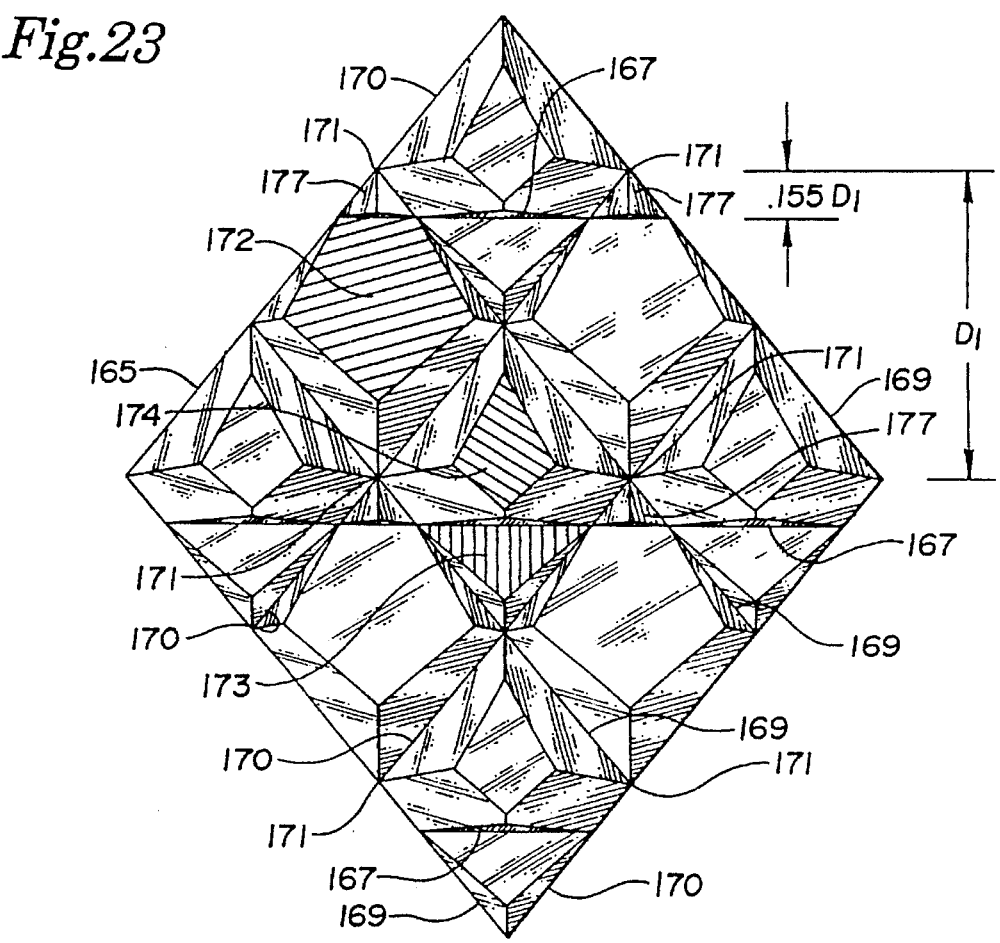
FIG. 23 is a plan view of a portion of a directly machined multiple geometric structure array having cube corner elements with canted symmetry axes, variable groove centering, and variable cube types.
Figure 24:
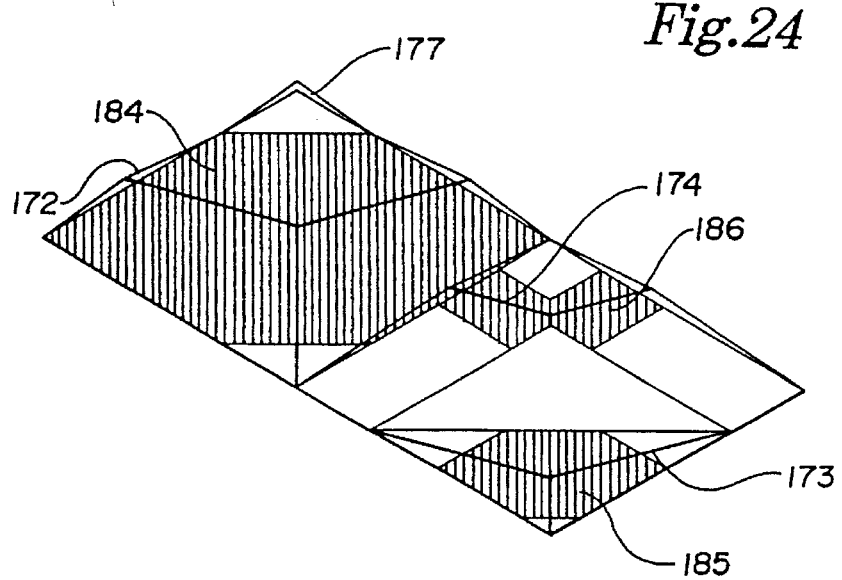
FIG. 24 is a perspective view of variably shaped active apertures of an array of the invention.

FIGS. 23 and 24 illustrate a multiple structure array 165 with the symmetry axis canted forward by 21.78°. Each of the primary grooves 167 has a 4° relief angle, and each of the secondary grooves 169, 170 has a 20° relief angle. The secondary groove intersection locations 171 are designed with a spacing distance $D_1$. Primary grooves 167 are equally spaced, also with the distance $D_1$, and are positioned at $0.155D_1$ from each adjacent intersection location 171. This pattern is repeated in other partial cube sub-elements. The array of FIG. 23 comprises a plurality of different, i.e., not congruently shaped, geometric structures including three different cube types depicted by numerals 172, 173, and 174 respectively. The different geometric structures in FIG. 23 have bases with either three or five sides when observed in plan view.

FIG. 24 shows the multiple differently sized and shaped active apertures 184, 185, 186, intermixed and arranged in close proximity, and corresponding to the three cube types numbered 172, 173, and 174 at a 60° entrance angle and a refractive index of 1.59. Total percent active aperture for array 165 is roughly 59 percent under these conditions. Aperture 186 is an example of an active aperture which is determined in part by an edge of the cube corner not coincident with the base. This design is useful in applications requiring high brightness at high entrance angles, for example, in pavement markers, roadway dividers, barriers, and similar uses.

Figure 25:
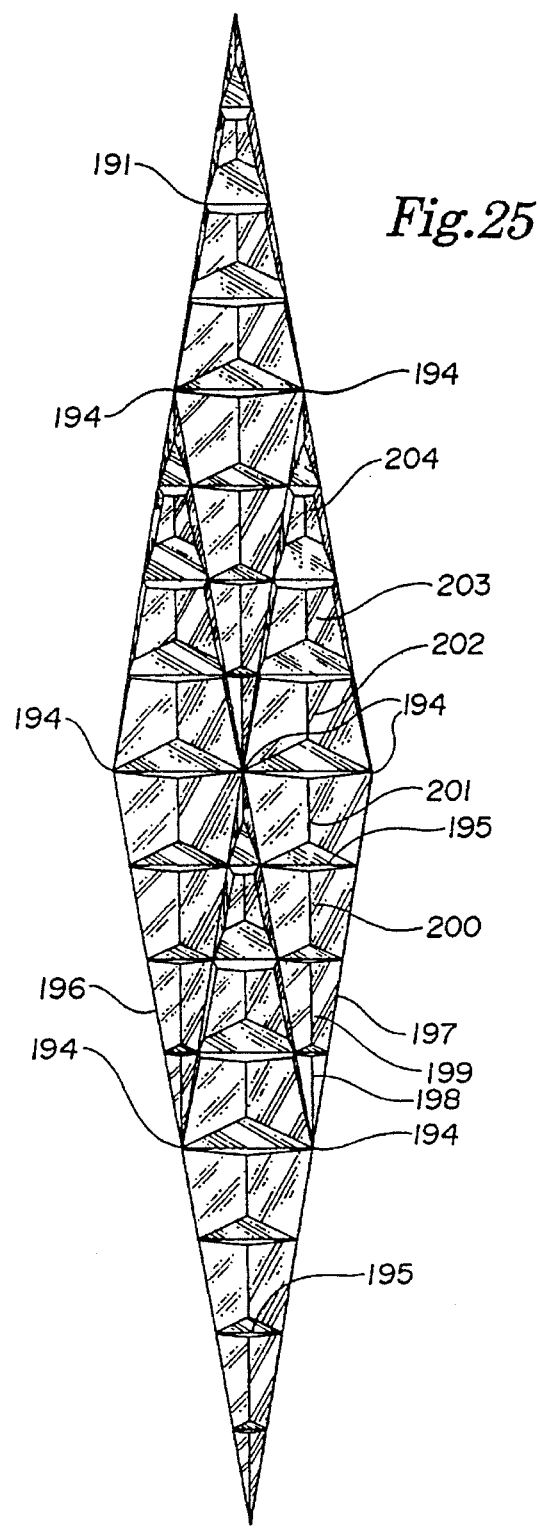
FIG. 25 is a plan view of a multiple structure cube corner element array formed from primary and secondary grooves intersecting with included angles of -82°, 82°, and 16°.

The invention permits numerous combinations of structures previously unknown and not possible within the art of retroreflective cube corner element design and manufacture, and in particular within the art of directly machined retroreflective cube corner element design and manufacture. FIG. 25 discloses, in plan view, multiple structure cube corner element array 191 formed from primary and secondary grooves intersecting with included angles 82°, 82°, and 16°. Primary grooves are equally spaced through array 191, with some of the primary grooves mutually intersecting the secondary grooves at locations 194. In this embodiment, the primary grooves 195 have a 30° relief angle, and the secondary grooves 196, 197 have a 3° relief angle. The array of FIG. 25 comprises a plurality of different geometric structures including seven different cube types depicted by numerals 198, 199, 200, 201, 202, 203, and 204, respectively. The different geometric structures in FIG. 25 have either three or four sides when viewed in plan view. Numerous different retroreflective cube corner elements are created which were not possible using previous manufacturing technologies.

Figure 26:
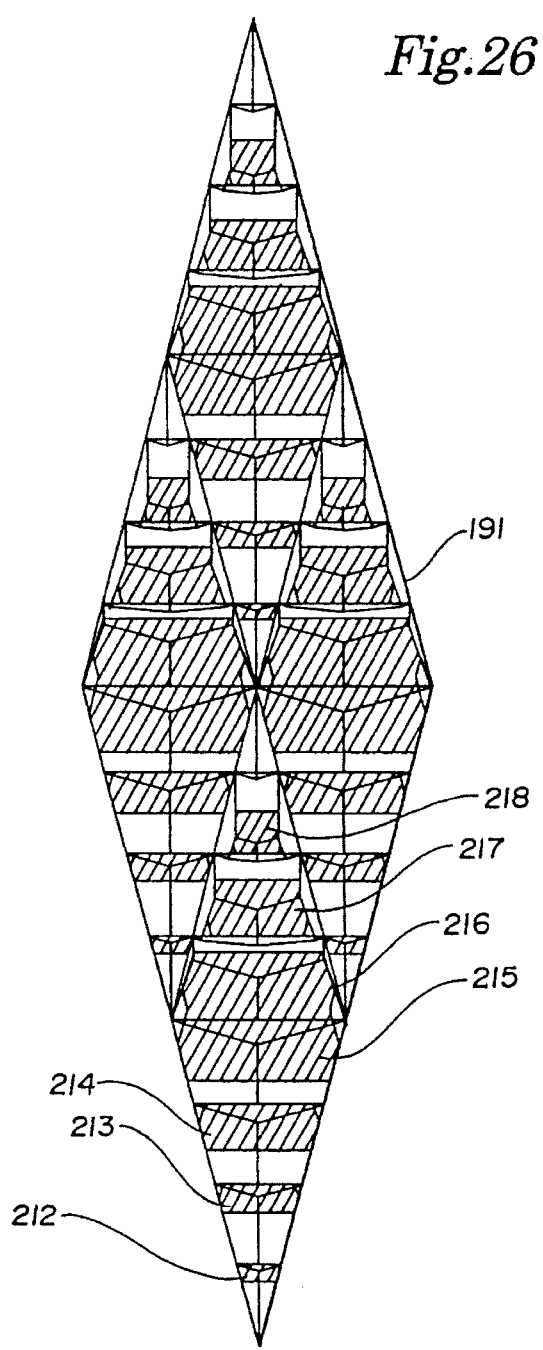
FIG. 26 is a schematic view of active apertures of the array shown in FIG. 25 at a 60° entrance angle.

When a light ray enters array 191 at a 60° entrance angle, and using a refractive index of 1.59, the array demonstrates an exceptional 63 percent active aperture as schematically shown in FIG. 26. This percent active aperture represents the combined optical performance of multiple differently sized and shaped apertures 212, 213, 214, 215, 216, 217, and 218, intermixed and arranged in close proximity, and corresponding to the different types of retroreflective cube corner elements 198, 199, 200, 201, 202, 203, and 204. Array 191 is also useful in applications requiring high brightness at high entrance angles such as pavement or channel markers, roadway dividers, barriers, and similar uses.

Figure 27:
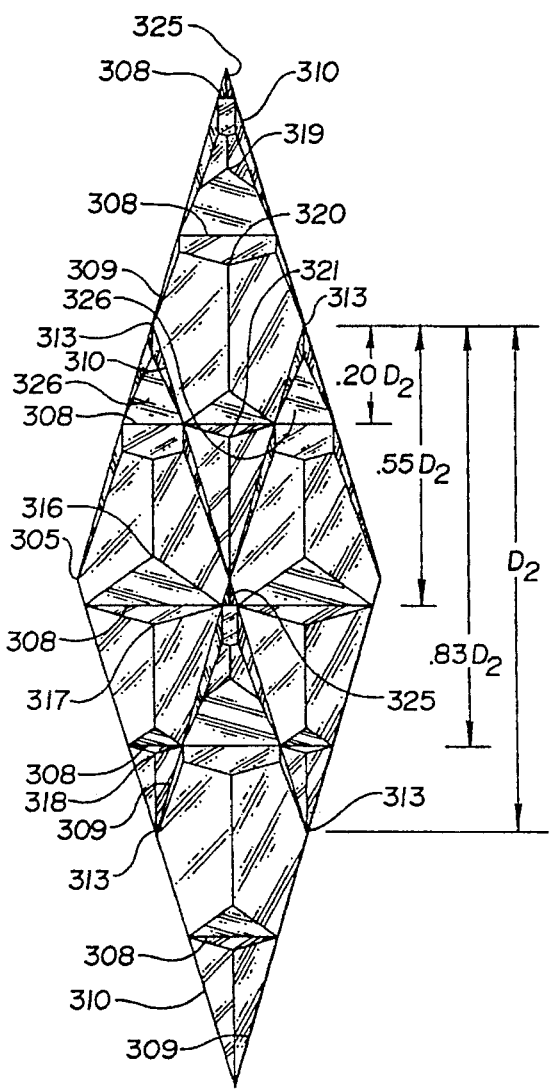
FIG. 27 is a plan view of a directly machined multiple structure array including a plurality of cube corner elements formed from primary and secondary grooves intersecting with included angles 74°, 74°, and 32°.
Figure 28:
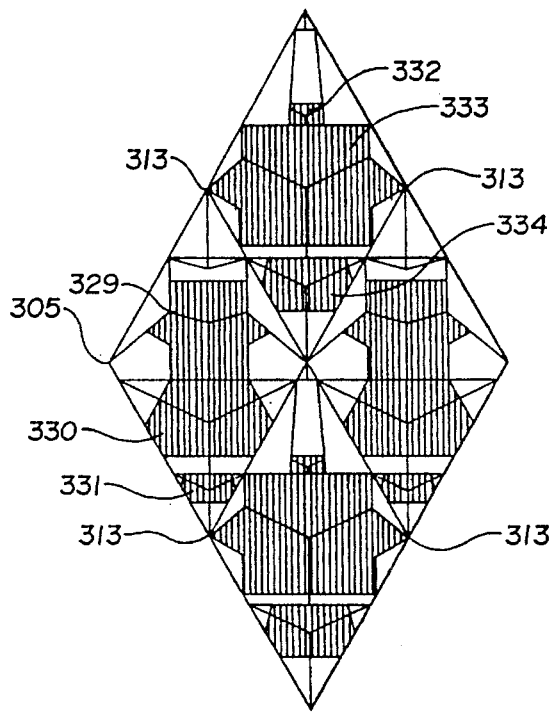
FIG. 28 is a schematic view of active apertures of the array shown in FIG. 27 at a 60° entrance angle.

FIGS. 27 and 28 illustrate a multiple structure array 305 comprising a plurality of cube corner elements each formed from primary and secondary grooves intersecting with included angles 74°, 74°, and 32°. Each of the primary grooves 308 has a 30° relief angle and each of the secondary grooves 309, 310 has a 3° relief angle. The secondary groove intersection locations 313 are designed with a spacing $D_2$. Three primary grooves are positioned in the partial cube sub-element with varying spacing at $0.20D_2$, $0.55D_2$, and $0.83D_2$ from the secondary groove intersections 313. This pattern is repeated in other partial cube sub-elements.

In the array of FIG. 27, there are six different cube types depicted by numerals 316, 317, 318, 319, 320, and 321. Trihedrons 325, 326 are examples of structures which are not retroreflective because the three faces are not orthogonal. FIG. 28 shows, for a 60° entrance angle and a refractive index of 1.59, the six active apertures 329, 330, 331, 332, 333, and 334, intermixed and arranged in close proximity, which are associated with cube types numbered 316 through 321, respectively. Percent active aperture for this array is approximately 63 percent, as shown in FIG. 28. The active aperture shapes in this design have roughly equal dimensions both parallel and perpendicular to the primary grooves even at a 60° entrance angle. These roughly circular aperture shapes produce light return patterns which are relatively circular and not significantly distorted due to diffraction. In contrast, conventional arrays specifically designed for high entrance angle high brightness applications exhibit highly elongated aperture shapes which significantly distort light return patterns. The multiple structure array 305 is particularly useful in applications requiring high brightness at high entrance angles, such as pavement or channel markers, roadway dividers, barriers, and similar uses.

As discussed above, many limiting cases of conventional cube corner element design are surpassed through use of multiple structure methods of manufacture. In some multiple structure designs, cube surfaces having some conventional cube geometries may occur as part of a plurality of cube types in a single array. However, the normal limits of conventional cube shapes and performances are not similarly bounded using multiple structure methods and structures.

Figure 29:
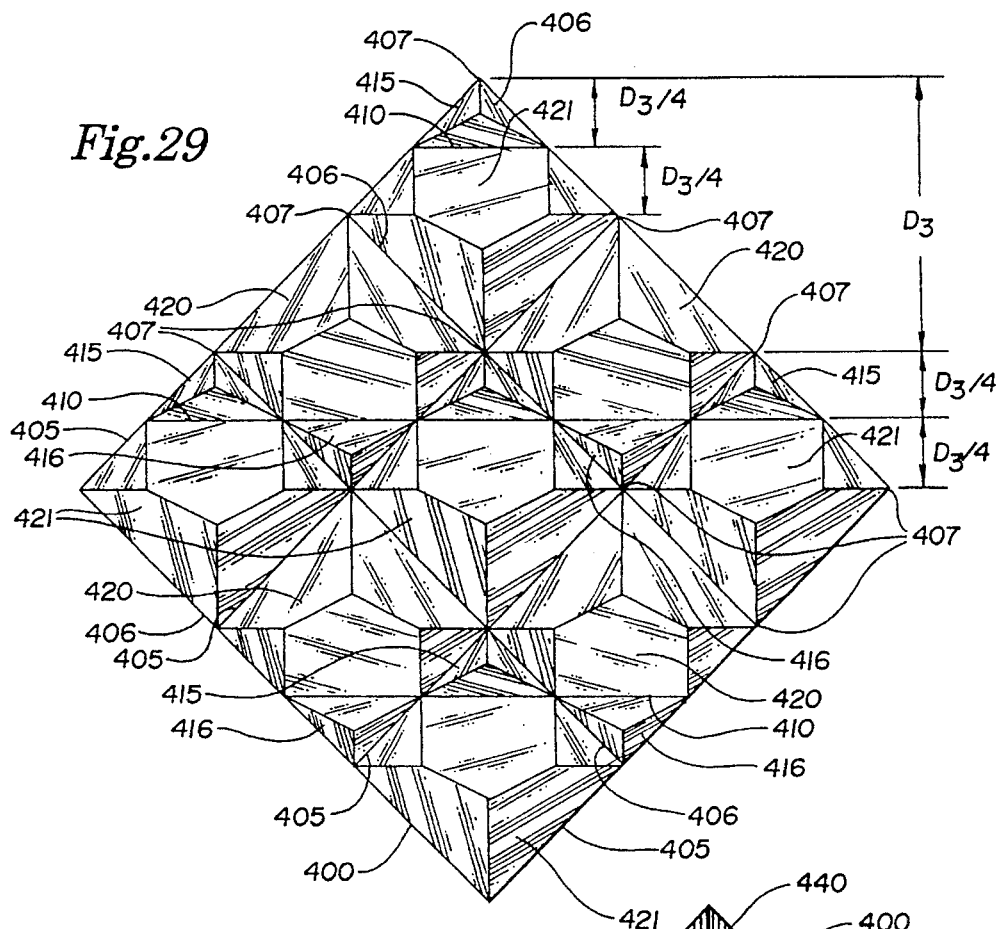
FIG. 29 is a plan view of a portion of a directly machined three groove set multiple structure cube corner element array having cube corner elements with canted symmetry axes, and variable groove centering.

FIG. 29 discloses another method by which directly machined masters of multiple structure cube corner element arrays may be manufactured. A multiple structure array 400 with the symmetry axis canted forward by 9.74° is formed using three sets of parallel grooves in a directly machined substrate. Each groove is preferably formed by a full angle machine tool which has two sides configured for cutting a retroreflective optical surface and which is maintained in an approximately constant orientation relative to the substrate during the formation of each groove. The full angle tools used to cut this multiple structure array are similar to those used to cut a conventional canted cube array such as described by Hoopman and shown above in FIG. 8. However, proper relative placement of the grooves in this multiple structure array results in improved and highly adaptable optical performance, improved physical characteristics, and cost efficiencies. These and other advantages are described more fully below.

The secondary grooves 405, 406 intersect at locations 407 which are designed with a spacing distance $D_3$. Primary grooves 410 do not mutually intersect the secondary grooves at locations 407, are equally spaced with the distance $D_3$, and are positioned at $0.25D_3$ from each adjacent intersection location 407. In this embodiment, this pattern is repeated in other partial cube sub-elements. The array of FIG. 29 comprises a plurality of different geometric structures including two different types of matched pairs of cube corner elements. The combination of cube elements 415 and 416 is representative of one type of matched pair which is not coincident along any base edge and share only a common base vertex. The combination of cube elements 420 and 421 is representative of a second type of geometrically different matched pair of cubes which share a coincident base edge.

The different geometric structures in FIG. 29 have either three or five sides when viewed in plan view. The plurality of structures including cube corner elements have different heights above a common reference plane. The intersections 407 of the secondary grooves 405, 406 are not coincident with any portion of the primary grooves 410 in this example, so the three sets of grooves do not mutually intersect.

Figure 30:
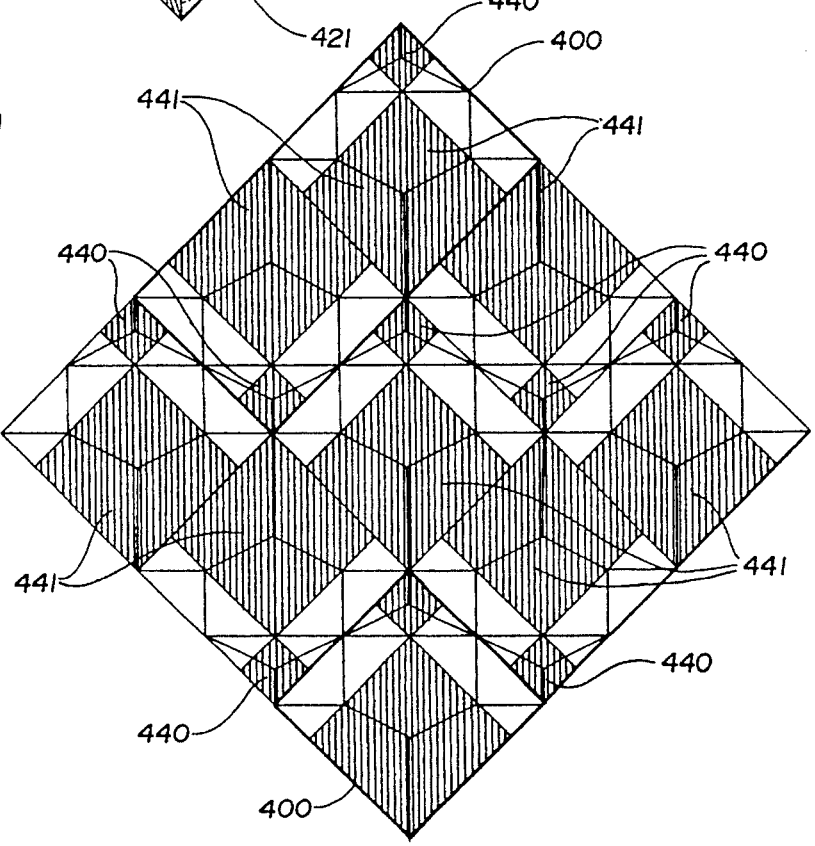
FIG. 30 is a schematic view of active apertures of the array shown in FIG. 29 at a 0° entrance angle.

FIG. 30 shows the two differently sized active apertures 440 and 441, intermixed and arranged in close proximity, at a 0° entrance angle. Active aperture 440 corresponds with cubes 415 and 416 while active apertures 441 corresponds with cubes 420 and 421. The active apertures for both cubes in each matched pair of cube corner elements are identical at 0° entrance angle. Total percent active aperture for this multiple structure array is approximately 62.5% at 0° entrance angle, which substantially exceeds the 50 percent active aperture possible for conventional arrays canted to the same degree such as shown in FIG. 8.

Figure 31:
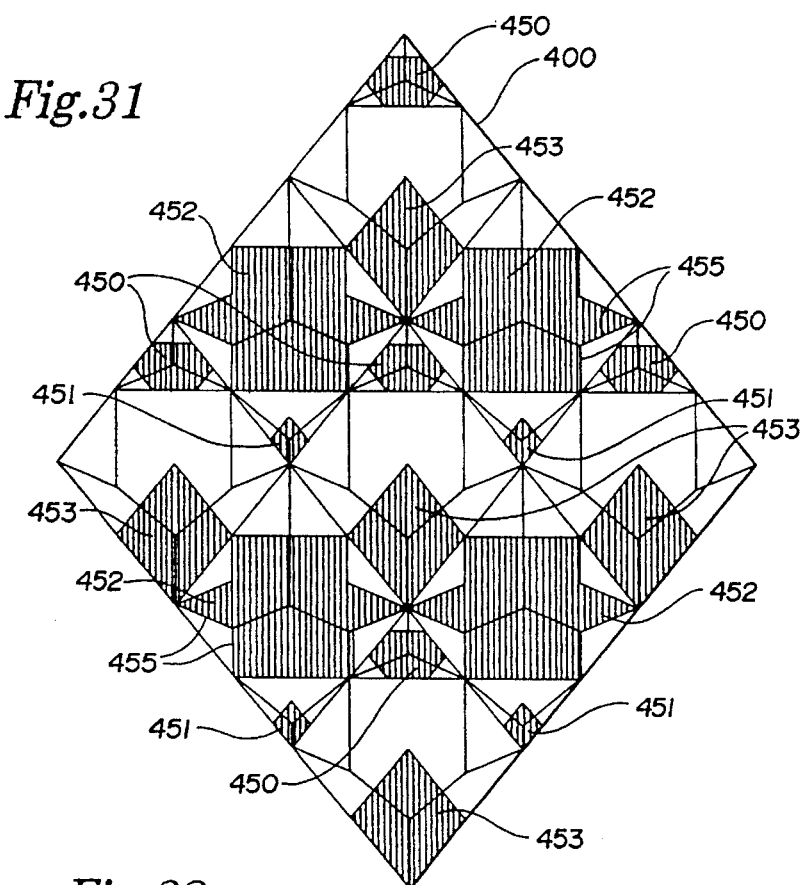
FIG. 31 is a schematic view of active apertures of the array shown in FIG. 29 at a 30° entrance angle.

At non-zero entrance angle, the four cube corner elements in the two matched pairs produce four differently sized and shaped active apertures. An example for a 30° entrance angle and a refractive index of 1.59 is presented in FIG. 31, where active apertures 450, 451, 452, and 453 correspond to multiple structure cube corner elements 415, 416, 420, and 421, respectively. The shape of aperture 452 is determined in part by edges 455 of the cube corner structure which are not coincident with the base. Total percent active aperture for this multiple structure array is roughly 48 percent at 30° entrance angle, which also exceeds the roughly 45 percent active aperture possible for conventional arrays canted to the same degree such as that shown in FIG. 8.

Figure 32:
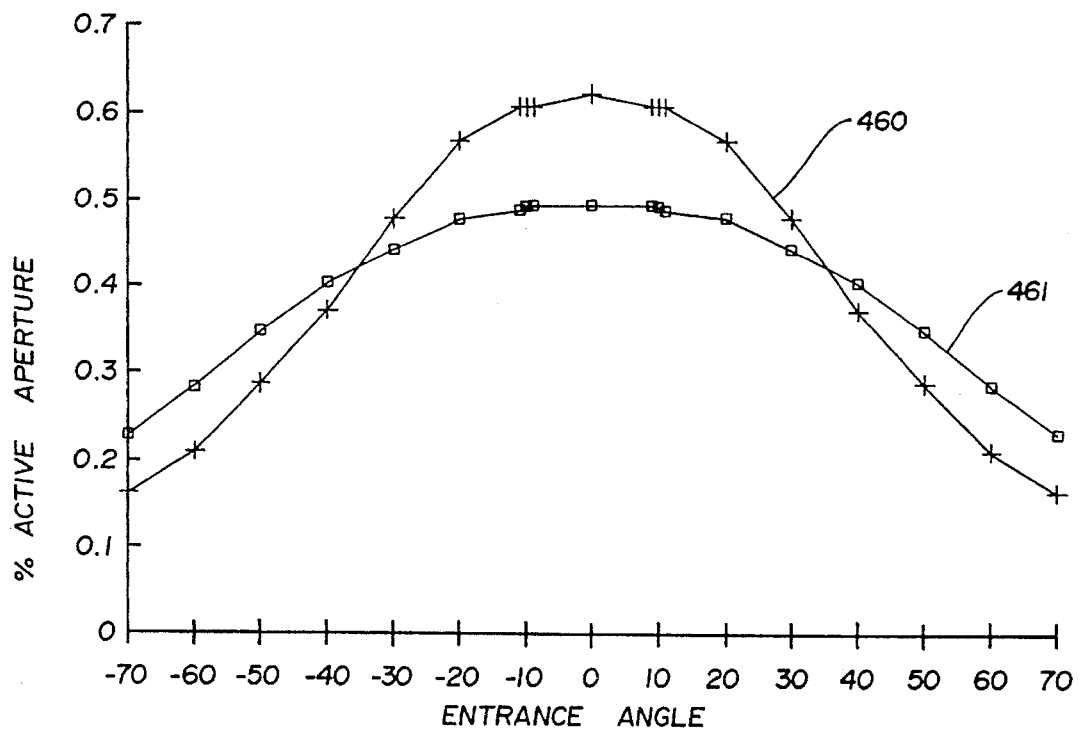
FIG. 32 is a graph depicting the percent active aperture as a function of entrance angle for the multiple structure array shown in FIG. 29.

FIG. 32 shows percent active aperture as a function of entrance angle in curve 460 for multiple structure array 400 shown in FIG. 29 and in curve 461 for a conventional Hoopman array, both of which are canted 9.74°. Both arrays exhibit symmetric entrance angularity when rotated about an axis in the plane of the sheeting. The multiple structure array exhibits higher percent active aperture at entrance angles up to roughly 35° for a refractive index of 1.59. At high entrance angles, the Hoopman array exhibits higher percent active aperture. However, multiple structure array 400 continues to retroreflect a significant amount of the incident light, even at very high entrance angles. This combination of relatively high light return at up to 35° entrance angles combined with adequate light return at very high entrance angles surpasses the performance of conventional canted and non-canted cube corner arrays. It is further recognized that a multiple structure array may be made which combines both mutually and not mutually intersecting grooves.

Variable groove spacing within any groove set may be used to produce multiple structure cube arrays with additional beneficial features. One such array 480 is presented in FIG. 33, where secondary groove intersections 407 are again designed with spacing $D_3$, similar to FIG. 29. However, the spacing of the primary grooves 470 relative to the secondary groove intersections 407 is varied in a repeating pattern throughout array 480. This multiple structure array with the symmetry axis again canted forward by 9.74° is formed with three sets of parallel grooves using full angle tools in a directly machined substrate. Six different types of matched pairs of cube corner elements are formed in array 480, with several of the pairs shown in shaded lines in FIG. 33. Each of the pairs has a different geometric structure. The six matched pairs comprising elements 415 and 416, 420 and 421, 488 and 489, 490 and 491, 492 and 493, and 494 and 495 may not share a coincident base edge, or even have a base vertex in common. For example, matched pairs of elements 488 and 489, 490 and 491, and 494 and 495 are completely separated within array 480. A wide range of aperture sizes and shapes will result in this array, with a corresponding improvement in the uniformity of the return energy pattern or divergence profile of the retroreflected light due to diffraction. Proper placement of grooves can be utilized advantageously during design to provide optimum product performance for a given application. The use of multiple matched pairs will again result in an array which exhibits asymmetric entrance angularity when rotated about an axis in the plane of the sheeting.

Figure 33:
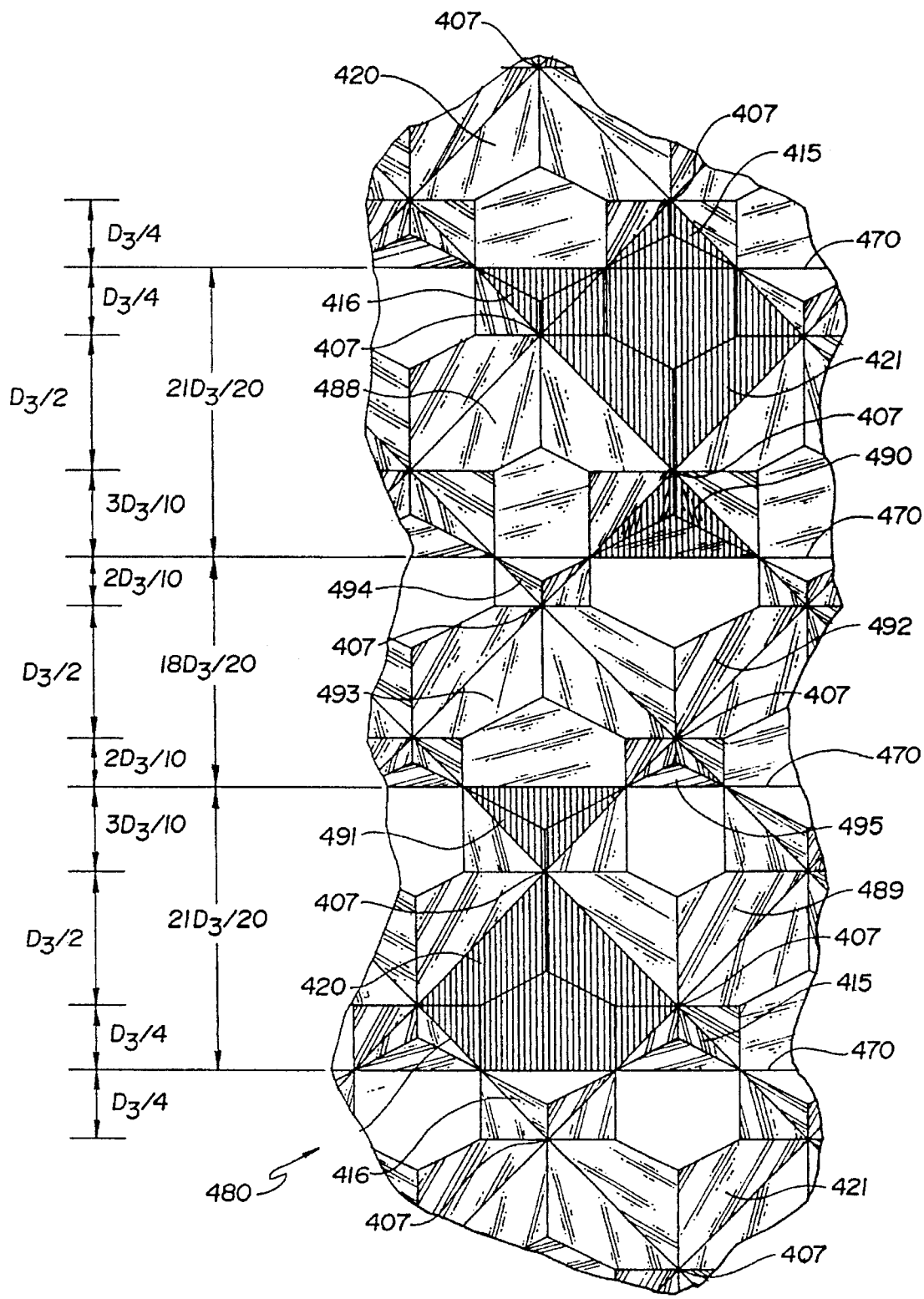
FIG. 33 is a plan view of a portion of a directly machined multiple structure cube corner element array having variable spacing between grooves.
Figure 34:
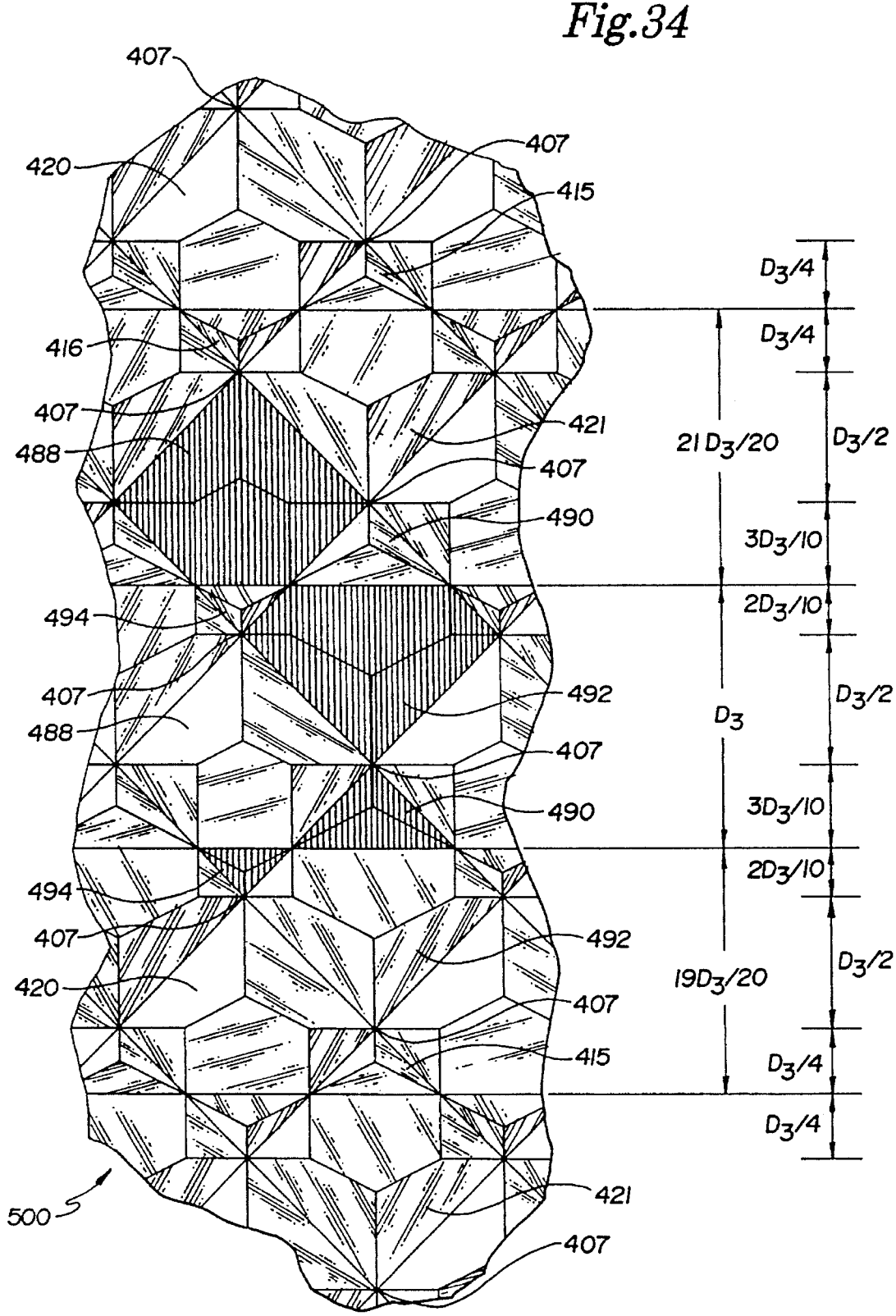
FIG. 34 is a plan view of a portion of a directly machined multiple structure cube array having variable spacing between grooves and in which at least one of the cube corner elements is not a part of a matched pair.

FIG. 34 discloses another array 500 having variable groove spacing in at least one of the groove sets. However, the spacing in FIG. 34 produces an array in which at least one of the cube corner elements is not a part of a matched pair. For example, cube corner elements 415 and 416 as well as 420 and 421 form matched pairs in array 500 while cube corner elements 488, 490, 492, and 494, each shown in shaded lines, are no longer part of matched pairs in FIG. 34. Elements 489, 491, 493, and 495 from FIG. 33, which were matched elements, no longer exist in array 500. This array will not exhibit symmetric entrance angularity when rotated about an axis in the plane of the sheeting. FIG. 33 and FIG. 34 further disclose examples of retroreflective cube corner articles which may be replicas of a directly machined substrate. These arrays have a plurality of groove sets which form optical surfaces, and at least one of the grooves forms cube corner element optical surfaces comprising lateral faces of geometric structures on only a portion of at least one side of the selected groove(s).

Conventional Hoopman arrays cannot be canted past the 9.74° limit without the mutually intersecting primary grooving tool removing the edges formed by the secondary grooves on adjacent cube elements. Multiple structure arrays such as those in FIGS. 29, 33, and 34 are formed using three sets of parallel grooves which do not necessarily mutually intersect. Therefore, cantings past the conventional limit may be beneficially used in multiple structure arrays without damaging adjacent cube elements and impairing optical performance.

Multiple structure geometries are particularly beneficial for use in applications requiring retroreflective sheeting having substantial total light return, such as traffic control materials, retroreflective vehicle or approach markings, photo-electric sensors, signs, internally illuminated retroreflective articles, reflective garments, and retroreflective markings. The enhanced optical performance and design flexibility resulting from multiple structure techniques and concepts relates directly to improved product performance and marketing advantage.

Total light return for retroreflective sheeting is derived from the product of percent active aperture and retroreflected light ray intensity. For some combinations of cube geometries, entrance angles, and refractive index, significant reductions in ray intensity may result in relatively poor total light return even though percent active aperture is relatively high. One example is retroreflective cube corner element arrays which rely on total internal reflection of the retroreflected light rays. Ray intensity is substantially reduced if the critical angle for total internal reflection is exceeded at one of the cube faces. Metallized or other reflective coatings on a portion of an array may be utilized advantageously in such situations. A portion, in this context, may comprise all or part of an array.

Composite tiling is the technique for combining zones of cube corner elements having different orientations. This is used, for example, with conventional arrays to provide sheeting with a uniform appearance at high angles of incidence regardless of orientation. In another example, composite tiling may be introduced to provide symmetric optical performance with respect to changes in entrance angle using arrays which individually exhibit asymmetric entrance angularity, as well as to modify the optical performance of arrays comprising non-triangular based cube corner prisms.

Figure 35:
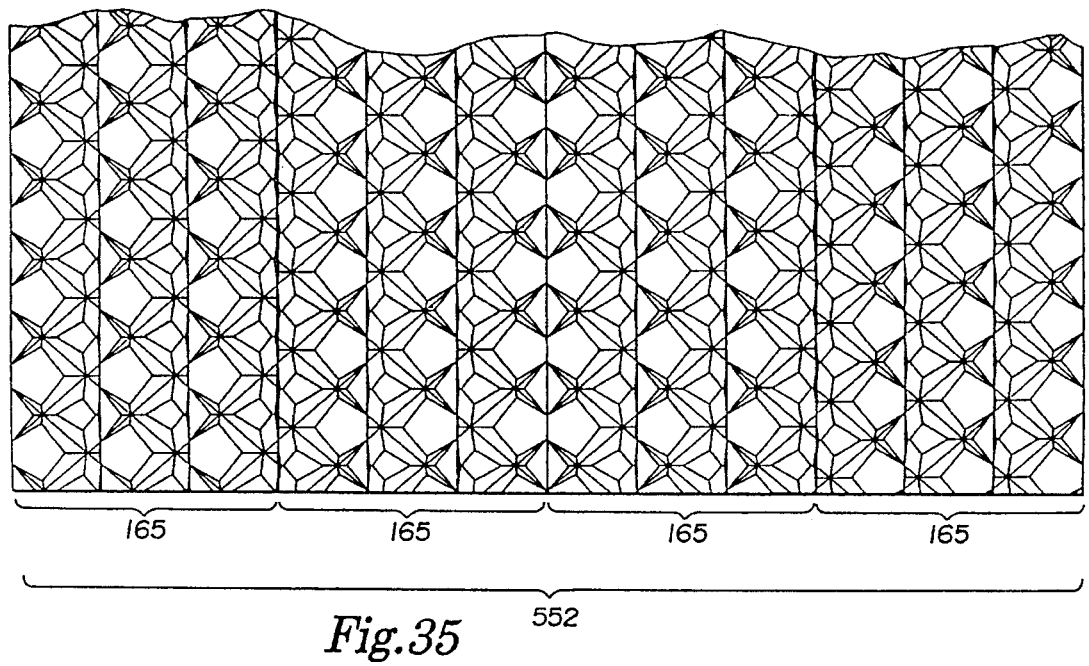
FIG. 35 is a plan view of a portion of a composite array comprising several zones of multiple structure arrays.

Referring to FIG. 35, composite array 552 comprises several zones of asymmetric arrays 165. Composite arrays may comprise several zones of different arrays including at least one zone comprising multiple structure arrays. Adjacent zones of multiple structure arrays may have different size and relative orientation. The size of the zones should be selected according to the requirements of particular applications. For example, traffic control applications may require zones which are sufficiently small that they are not visually resolvable by the unaided human eye at the minimum expected viewing distance. This provides a composite array with a uniform appearance. Alternatively, channel marking or directional reflector applications may require zones which are sufficiently large that they can be easily resolved by the unaided human eye at maximum required viewing distance.

Figure 36:
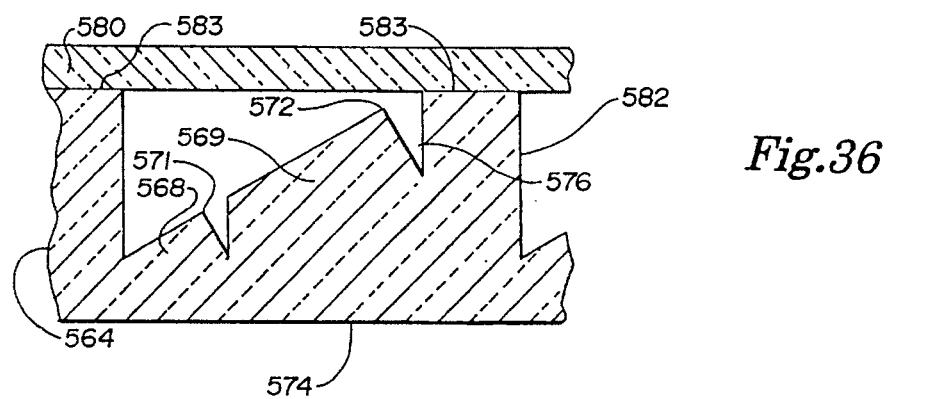
FIG. 36 is a section view of one embodiment of a multiple structure array having truncated surfaces.

FIG. 36 is a side section view of one embodiment of the present invention. This view shows part of a multiple structure array 564 which is similar to array 141 shown in FIG. 21, although this embodiment of the invention may also be used with other array configurations. FIG. 36 further illustrates the advantages of multiple structure manufacturing methods in providing geometric structures at different heights above a common reference plane and utilizing varying depth of groove during machining. For example, at least a portion of groove 576 is machined to a depth into the substrate which is different from the depth of groove 575. The multiple structures in array 564 may comprise individual retroreflective cube corner elements 568, 569, non-retroreflective pyramids, frustums, posts 582, or other structures positioned above common reference plane 574.

Cube peaks 571, 572, or other features machined from the original substrate, may also be truncated for specialized effect or use. Truncation may be accomplished by various techniques, including, for example, controlling depth of cut of the grooves, or further removal of substrate material after formation of the primary and secondary grooves.

Retroreflective directly machined cube corner articles are often designed to receive a sealing film which is applied to the retroreflective article in order to maintain a low refractive index material, such as air, next to the retroreflective elements for improved performance. In conventional arrays this medium is often placed in direct contact with the cube corner elements in ways which degrade total light return. However, using multiple structure constructions, a sealing medium 580 may be placed on the highest surface 583 of the array without contacting and degrading the optical properties of lower retroreflective cube corner elements. The highest surface may comprise cube corner elements, non-retroreflective pyramids, frustums, posts, or other structures. In FIG. 36, the highest surface 583 has been truncated. Although slight height variations may result from slight non-uniformity of groove positions or included angle of cube corner elements due to machining tolerances or intentional inducement of non-orthogonality, these variations are not analogous to the variations disclosed and taught in this invention. For arrays using a sealing medium, the truncated surfaces may be used both to hold the medium above the cube corner elements as well as to increase the light transmissivity of the sheeting. Light transmissivity of the sheeting may be increased through use of a transparent or partially transparent sealing medium.

Figure 37:
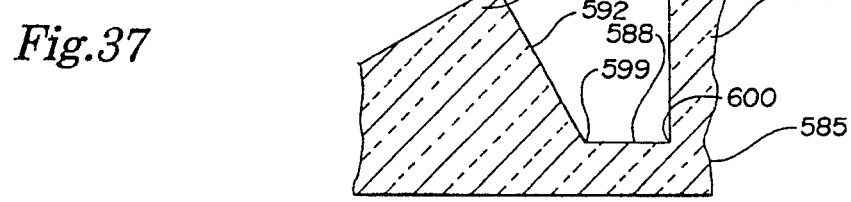
FIG. 37 is a section view of one embodiment of a multiple structure array having a separation surface.

FIG. 37 is a section view of another embodiment of the present invention. This view shows part of a multiple structure array 585 similar to a portion of array 564 in FIG. 36 but including the use of a separation surface 588. The lateral faces 592, 593 of geometric structures 595, 596 form the boundary edges 599, 600 for the separation surface. The lateral faces may include cube corner element optical surfaces as well as non-optical surfaces on cube corner and other geometric structures. The separation surface 588 may have flat or curved portions when viewed in cross section.

Separation surfaces may be advantageously utilized to increase light transmission or transparency in sheeting, including flexible sheeting, utilizing multiple structure retroreflective cube corner element arrays. For example, this is particularly useful in internally illuminated retroreflective articles such as signs or automotive signal light reflectors, which are normally manufactured using injection molding. In the embodiment shown in FIG. 37, separation surfaces are shown in combination with truncated surfaces of highest surfaces 583, although either feature may be utilized independently. Separation surface 588 may be formed using a machining tool with a flat or curved tip, or by further removal of material from a replica of the multiple structure cube corner element array master.

Suitable materials for retroreflective articles or sheeting of this invention are preferably transparent materials which are dimensionally stable, durable, weatherable, and easily replicated into the desired configuration. Examples of suitable materials include glass; acrylics, which have an index of refraction of about 1.5, such as Plexiglas brand resin manufactured by Rohm and Haas Company; polycarbonates, which have an index of refraction of about 1.59; reactive materials such as taught in U.S. Pat. Nos. 4,576,850, 4,582,885, and 4,668,558; polyethylene based ionomers, such as those marketed under the brand name of SURLYN by E. I. Dupont de Nemours and Co., Inc.; polyesters, polyurethanes; and cellulose acetate butyrates. Polycarbonates are particularly suitable because of their toughness and relatively higher refractive index, which generally contributes to improved retroreflective performance over a wider range of entrance angles. These materials may also include dyes, colorants, pigments, UV stabilizers, or other additives. Transparency of the materials ensures that the separation or truncated surfaces will transmit light through those portions of the article or sheeting.

The incorporation of truncated and/or separation surfaces does not eliminate the retroreflectivity of the article, but rather it renders the entire article partially transparent. In some applications requiring partially transparent materials, low indices of refraction of the article will improve the range of light transmitted through the article. In these applications, the increased transmission range of acrylics (refractive index of about 1.5) is desirable.

In fully retroreflective articles, materials having high indices of refraction are preferred. In these applications, materials such as polycarbonates, with refractive indices of about 1.59, are used to increase the difference between the indices of the material and air, thus increasing retroreflection. Polycarbonates are also generally preferred for their temperature stability and impact resistance.

Various modifications and alterations of this invention will become apparent to those skilled in the art without departing from the scope and spirit of this invention.

What is claimed:

1. A method of manufacturing a cube corner article, comprising the steps of:

providing a machinable substrate;

machining in the substrate a first groove set comprising a plurality of parallel grooves such that at least two adjacent grooves in the first groove set are displaced by a first distance $d_1$;

machining in the substrate a second groove set comprising a plurality of parallel grooves such that at least two adjacent grooves in the second groove set are displaced by a second distance $d_2$, the second groove set intersecting the first groove set at a plurality of intersection locations; and machining in the substrate a third groove set comprising a plurality of parallel grooves such that at least two adjacent grooves in the third groove set are displaced by a third distance $d_3$, different from $d_1$ and $d_2$, at least one of the grooves in the third groove set intersecting the first groove set and the second groove set at a point displaced from the intersection locations, thereby forming a structured surface comprising an array of cube corner elements including at least two non-congruently shaped cube corner elements.

2. The method of claim 1, wherein:

the step of machining the first groove set includes machining at least one groove using an asymmetric tool.

3. The method of claim 1, wherein:

the step of machining the second groove set includes machining at least one groove using an asymmetric tool.

4. The method of claim 1, wherein:

the step of machining the third groove set includes machining at least one groove using an asymmetric tool.

5. The method of claim 1, further comprising the step of:

varying the distance $d_3$ between adjacent grooves in the third groove set.

6. The method of claim 1, wherein:

the step of machining said third groove set comprises the step of machining a relief angle in at least one groove, the relief angle measuring at least 3 degrees.

7. The method of claim 1, further comprising the step of:

machining one groove in said substrate to a first depth; and machining a second groove in said substrate to a second depth, different from the first depth.

8. The method of claim 1, further comprising the step of:

removing a portion of at least one cube corner element in the array to form a geometric structure suitable for supporting a sealing medium.

9. The method of claim 1, further comprising the step of:

replicating the structured surface to form a negative copy of the cube corner array.

10. The method of claim 1, further comprising the step of:

replicating the negative copy to form a copy of the cube corner array in a material suitable for use as retroreflective sheeting.

* * * * *